(12) United States Patent
Skinner et al.

(10) Patent No.: US 10,983,000 B2
(45) Date of Patent: Apr. 20, 2021

(54) LIGHT MEASURING PROBES, LIGHT MEASURING SYSTEMS, AND RELATED METHODS

(71) Applicants: Heraeus Noblelight America LLC, Gaithersburg, MD (US); Heraeus Noblelight GmbH, Hanau (DE)

(72) Inventors: Brett Skinner, Silver Spring, MD (US); William C. Harper, Middletown, MD (US); Darrin Leonhardt, Gaithersburg, MD (US); Ralf Dreiskemper, Kleinostheim (DE)

(73) Assignees: Heraeus Noblelight America LLC, Gaithersburg, MD (US); Heraeus Noblelight GmbH, Hanau (DE)

( * ) Notice: Subject to any disclaimer, the term of this patent is extended or adjusted under 35 U.S.C. 154(b) by 210 days.

(21) Appl. No.: 16/149,354

(22) Filed: Oct. 2, 2018

(65) Prior Publication Data

US 2019/0107435 A1    Apr. 11, 2019

Related U.S. Application Data

(60) Provisional application No. 62/568,995, filed on Oct. 6, 2017.

(51) Int. Cl.
| | | |
|---|---|---|
| *G01J 1/44* | (2006.01) | |
| *G01J 3/30* | (2006.01) | |
| *G01J 1/04* | (2006.01) | |
| *G01J 3/02* | (2006.01) | |
| *G01J 1/02* | (2006.01) | |
| *G01J 1/42* | (2006.01) | |

(52) U.S. Cl.
CPC ............... *G01J 1/44* (2013.01); *G01J 1/0209* (2013.01); *G01J 1/0403* (2013.01); *G01J 1/0422* (2013.01); *G01J 1/429* (2013.01); *G01J 3/0216* (2013.01); *G01J 3/30* (2013.01)

(58) Field of Classification Search
CPC ...... G01J 1/0209; G01J 1/0403; G01J 1/0422; G01J 1/429; G01J 1/44; G01J 3/0216; G01J 3/30
USPC .......................................................... 356/402
See application file for complete search history.

(56) References Cited

U.S. PATENT DOCUMENTS

| | | | | |
|---|---|---|---|---|
| 4,623,789 A | * | 11/1986 | Ikeda .................. | A61B 5/0059 250/227.11 |
| 4,710,638 A | | 12/1987 | Wood | |
| 5,972,716 A | * | 10/1999 | Ragusa ............... | C12Q 1/6818 422/82.02 |
| 9,702,815 B2 | * | 7/2017 | Dalal .................. | G01N 21/359 |
| 2012/0002915 A1 | * | 1/2012 | Shiraishi ............. | G02B 6/4214 385/14 |

(Continued)

OTHER PUBLICATIONS

Sola-Check UV/Near Visible Radiometer by Solatell Ltd., Website and Brochure, http://www.solatell.com/Prod_SC_UV_light_sensor.htm, 3 pgs.

*Primary Examiner* — Sunghee Y Gray
(74) *Attorney, Agent, or Firm* — Stradley Ronon Stevens & Young, LLP

(57) ABSTRACT

A system for measuring light in a tube is provided. The system includes a tube, a light collecting probe configured to absorb light within the tube, a data acquisition system for determining a level of light associated with light absorbed by the light collecting probe, and a motion system for moving the light collecting probe within the tube.

13 Claims, 7 Drawing Sheets

(56) References Cited

U.S. PATENT DOCUMENTS

2014/0378847 A1* 12/2014 Ito ..................... A61B 5/0084
600/478
2016/0299170 A1* 10/2016 Ito ..................... A61B 1/00177
2018/0257983 A1    9/2018 Heck et al.

* cited by examiner

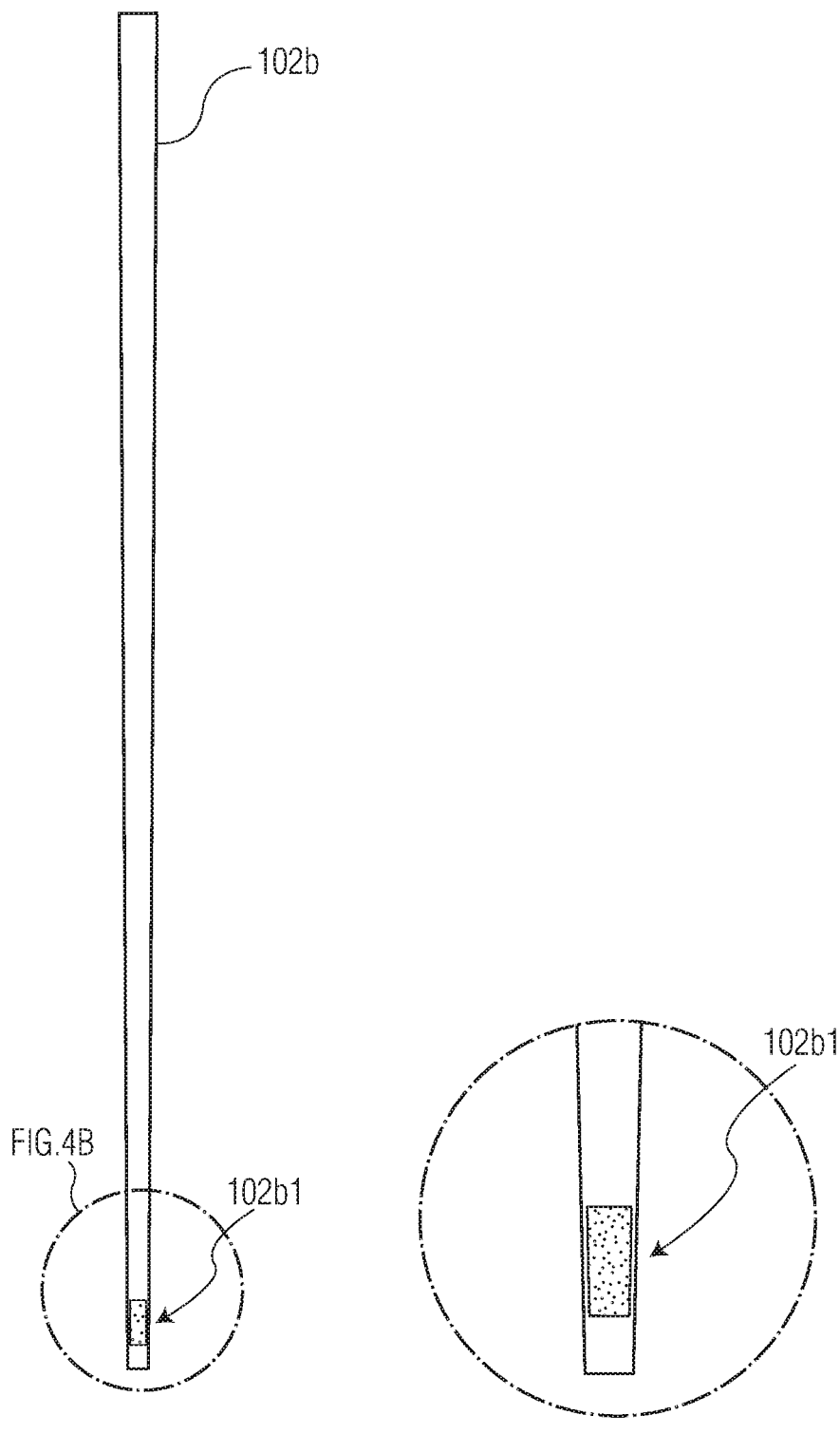

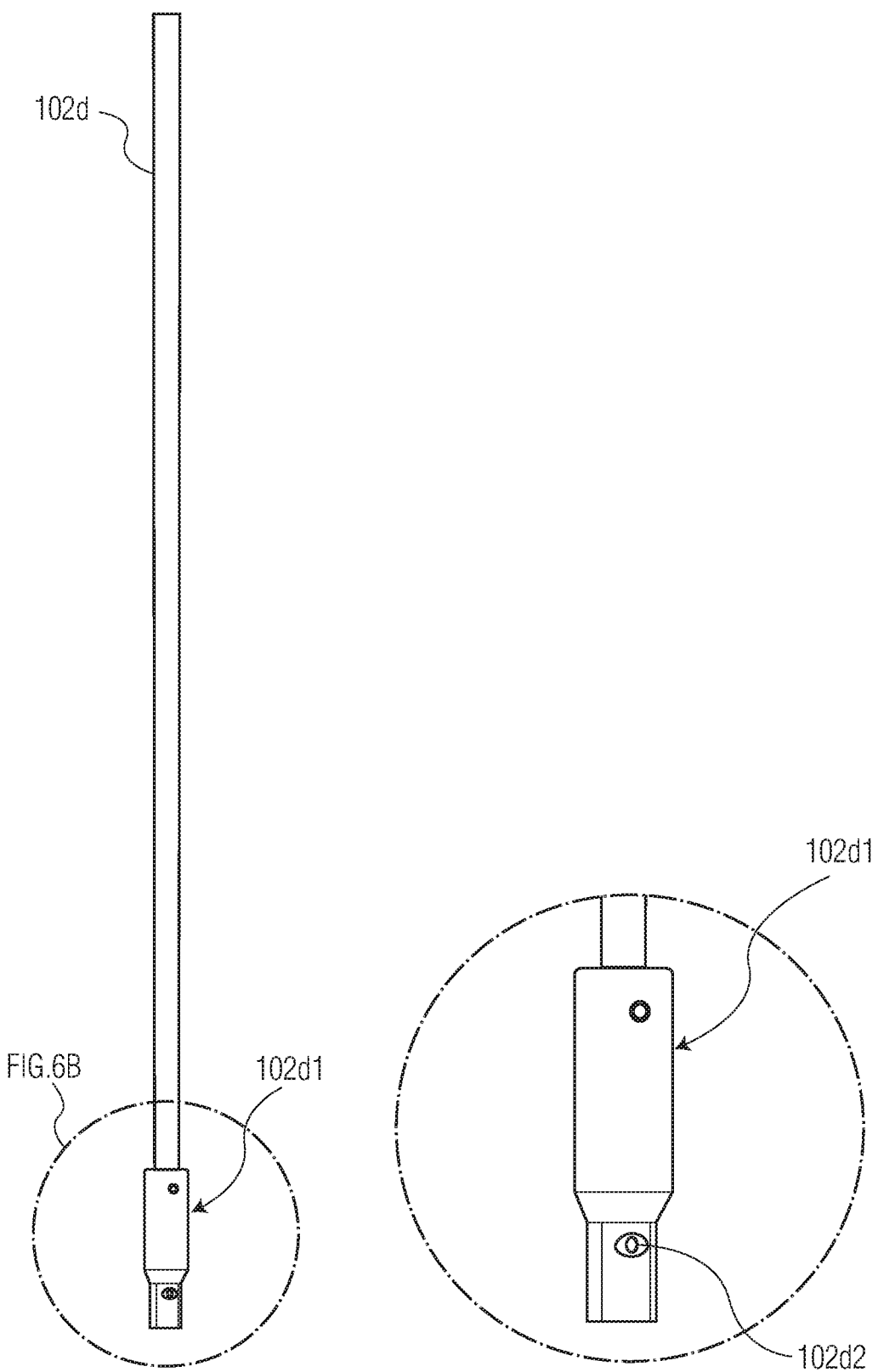

LIGHT MEASURING PROBES, LIGHT MEASURING SYSTEMS, AND RELATED METHODS

CROSS-REFERENCE TO RELATED APPLICATION

This application claims the benefit of U.S. Provisional Patent Application No. 62/568,995, filed Oct. 6, 2017, the content of which is incorporated herein by reference.

FIELD

The invention relates to light measuring probes and related light measuring systems, and more particularly, to improved light measuring probes and systems for use in connection with optical fiber processing.

BACKGROUND

Ultraviolet light (e.g., ultraviolet light using microwave lamps, ultraviolet light using LEDs, etc.) is often used in connection with curing of coatings applied to optical fibers during the manufacturing and processing of such optical fibers. Exemplary conventional systems for such curing operations is disclosed in U.S. Pat. No. 4,710,638.

In certain applications, ultraviolet light may be applied to process/cure a coating on an optical fiber in a tube or the like. It may be desirable to identify critical process parameters (e.g. light intensity at the optical fiber, light uniformity at the optical fiber, etc) in connection with such applications. Improved systems and methods for identifying such parameters would be desirable.

SUMMARY

According to an exemplary embodiment of the invention, a system for measuring light in a tube is provided. The system includes a tube, a light collecting probe configured to absorb light within the tube, a data acquisition system for determining a level of light associated with light absorbed by the light collecting probe, and a motion system for moving the light collecting probe within the tube.

According to another exemplary embodiment of the invention, a method of measuring light in a tube is provided. The method includes the steps of: (a) providing a light collecting probe to absorb light in the tube; (b) moving the light collecting probe to different locations in the tube using a motion system; and (c) determining a level of light associated with light absorbed by the light collecting probe at each of the different locations. The level of light at each of the different locations (and/or the light wavelength distribution) may be collected in a light map or spectrum of the interior portion of the tube at which the light is measured.

According to additional exemplary embodiments of the invention, various light collecting probes are provided. The probes include a rod shaped body portion terminating at a light collecting tip portion. The light collecting tip portion may have a conical shape, a spherical shape, or a cylindrical shape (or a partially cylindrical shape), among other shapes.

According to yet another exemplary embodiment of the invention, a light collecting probe is provided. The light collecting probe includes a rod shaped body portion terminating at a light collecting tip portion and a cap portion for covering the light collecting tip portion to block light from entering the light collecting tip portion. The cap portion defines an aperture configured to allow light to be selectively received by the light collecting tip portion.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIG. 4A is a side view of another light measuring probe in accordance with another exemplary embodiment of the invention;

FIG. 4B is a detailed view of a portion of the light measuring probe of FIG. 4A;

FIG. 6A is a side view of yet another light measuring probe in accordance with another exemplary embodiment of the invention; and FIG. 6B is a detailed view of a portion of the light measuring probe of FIG. 6A.

DETAILED DESCRIPTION

Figure 1A:
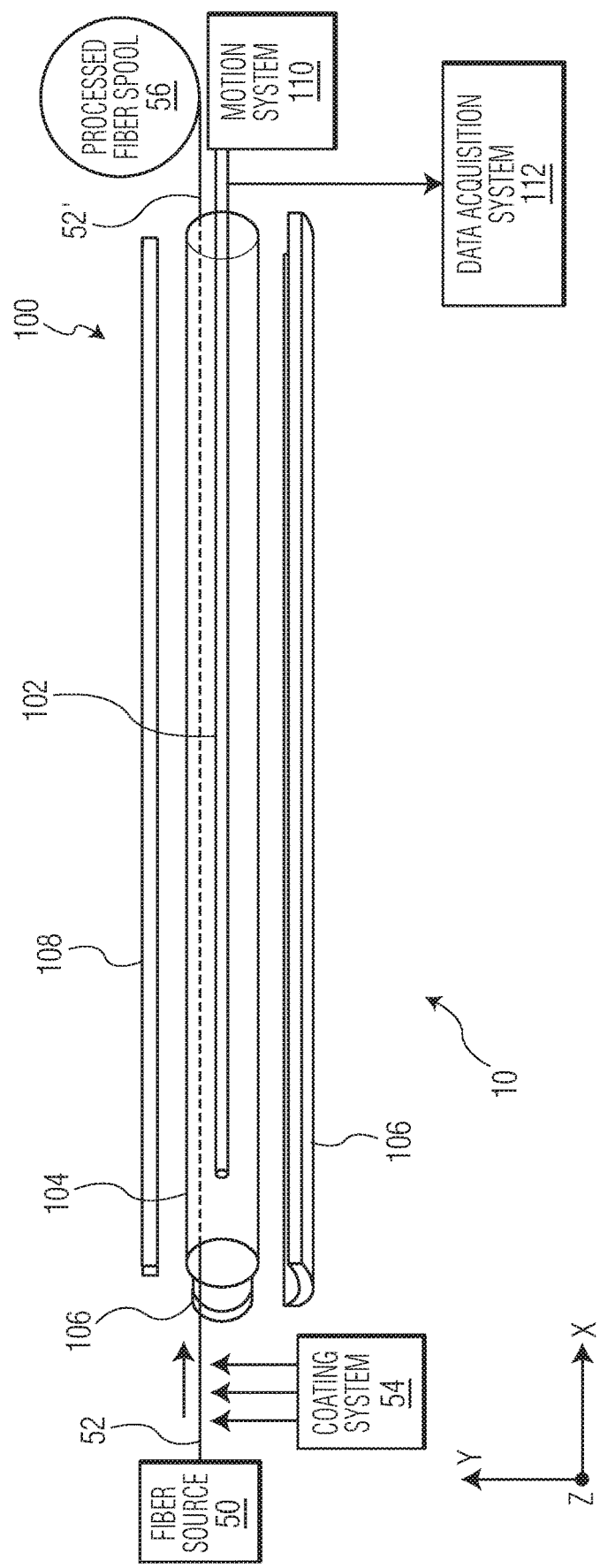
FIG. 1A is a side perspective view of an optical fiber processing system, including a light measuring system, in accordance with an exemplary embodiment of the invention.

In accordance with certain exemplary embodiments of the invention, light measuring systems are provided which can provide data related to the light in 2D (or 3D) and is omni-directional. In using a combination of the light collecting probes and/or moveable probes for moving within a curing system (e.g., within a tube of the curing system), a full radiation pattern (and therefore optical performance) of the curing system (e.g., an ultraviolet curing system) can be generated. For example, the total irradiance, as well as angular distribution of the irradiance, can be determined using aspects of the invention.

Aspects of the invention relate to optical measurement devices which may be used to characterize the distribution and/or directionality of UV/VIS/IR radiation in a confined (e.g., tubular) volume. It is particularly useful for qualifying and quantifying the radiation (e.g., ultraviolet radiation) in the curing tubes used in optical fiber production.

Inventive light collecting probes (e.g., quartz rods with special features, etc.) may be used as waveguides in connection with aspects of the invention. Example light collecting probes may be used within commonly sized transparent quartz curing tubes used in UV lamp light shields designed for curing optical fiber (e.g., 21 mm ID, 23 mm OD). Example light collecting probes are made from solid quartz rods with varying tip portions, where the tip portions may be considered the light sensors. Such probes may be designed to view the entire optical system within a quartz curing tube, while also being the least intrusive to the optical field pattern within the quartz curing tube. Other example light collecting probes are fitted with cap portions, with a PTFE (i.e., polytetrafluoroethylene) block as a sensor under the cap portion. The cap portion may be a metal shield with an aperture that precisely defines the sensor's active area and incident light acceptance angle. Such a probe may be used (in connection with a data acquisition system, for example, including a photodetector) to specifically determine uniformity of the radiation radially arriving at the fiber area.

Example light collecting probes are made from a quartz rod material (e.g., a 3 mm diameter, high purity, quartz rod material). Exemplary probes include a length of such a rod material (e.g., a rod shaped body portion) and a small sensor at one end of the quartz rod (e.g., a light collecting tip portion, where at least a portion of the light collecting tip portion may be "frosted"). Such probes may include a diffusive sensor surface accepting light from all incident angles equally well, thereby providing a cosine response (where the cosine response is the relationship between irradiance on a surface and the incident angle of the incoming radiation, where, desirably, the intensity falls off in proportion to the cosine of the incident light angle). A portion of the light absorbed at the light collecting tip portion is guided along the probe length and then detected at the other end of the rod shaped body portion (e.g., a quartz waveguide rod).

Referring now to the drawings, FIG. 1A illustrates an optical fiber processing system 10 including an inventive light measuring system 100. System 10 includes fiber source 50 (e.g., a source of optical fiber drawn from bulk material) that provides optical fiber 52 that moves along the x-axis shown in FIG. 1A. Optical fiber 52 is coated (e.g., using conventional optical fiber coating techniques) using coating system 54. After the coating of optical fiber 52 using coating system 54, the applied coating is cured in tube 104. That is, tube 104 may be a transparent tube that transmits light from one or more light producing elements 108 (e.g., microwave ultraviolet light sources, ultraviolet LED light sources, among others) positioned outside of tube 104 (the closest light producing element 108 has been removed in FIG. 1A for clarity). Reflectors 106 are shown below tube 104, and to a first side of tube 104, to redirect light back towards tube 104 for curing. After curing of the coating in tube 104, optical fiber 52' (optical fiber 52, now including the coating from coating system 54, is labelled as optical fiber 52') may be spooled on fiber spool 56. According to aspects of the invention, light measuring system 100 includes one or more light collecting probes 102 positioned in tube 104. Light collecting probe 102 is moved using motion system 110 (e.g., a 3D translation stage), which may be configured to move light collecting probe along one more motion axes (e.g., along the x-axis, along the y-axis, along the z-axis, along a rotative axis such as a theta axis, etc.). As will be appreciated by those skilled in the art, motion system 110 may include one or more motors (e.g., linear motors, stepper motors, etc.). Further, motion system 110 may be used (as desired) to move light collecting probe 102 into tube 104, for example, entering the right side of tube 104 as illustrated in FIG. 1A. Light absorbed/collected in tube 104 using light collecting probe 102 may be guided along light collecting probe 102 to a data acquisition system 112 to determine a level of light associated with the light absorbed/collected. As light collecting probe 102 is moved to different locations in tube 104 (and/or if multiple probes are used to measure light at different locations in tube 104), data acquisition system 112 may be used (in connection with a computer device or the like) to map the light level and/or light spectrum within tube 104.

In typical operation, light measuring system 100 (including light collecting probe 102) would not be utilized during the fiber drawing and coating process, as shown in FIG. 1A. That is, for purposes of illustration, elements of light measuring system 100 are shown in place in FIG. 1A, while an optical fiber 52 is being drawn/coated; however, it is understood that light measuring system 100 would typically be used when no optical fiber is in tube 104.

Figure 1B:
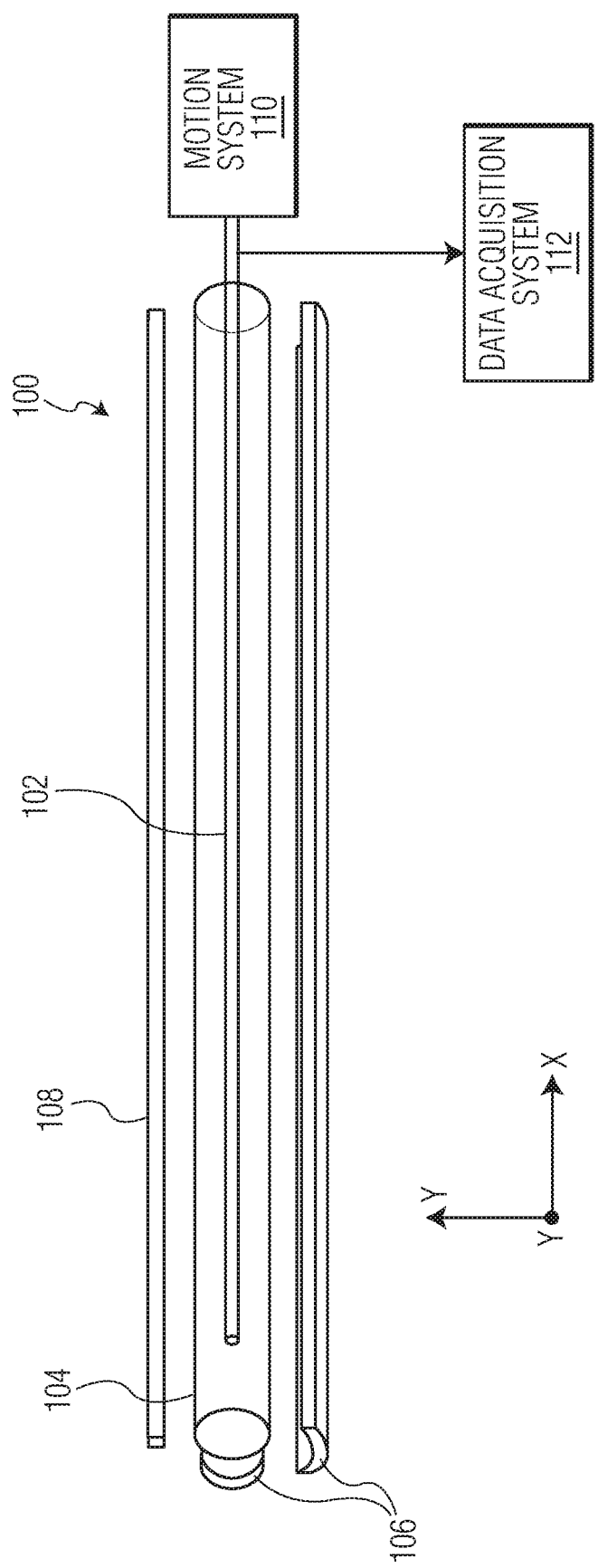
FIG. 1B is a side perspective view of the light measuring system from FIG. 1A.
Figure 1C:
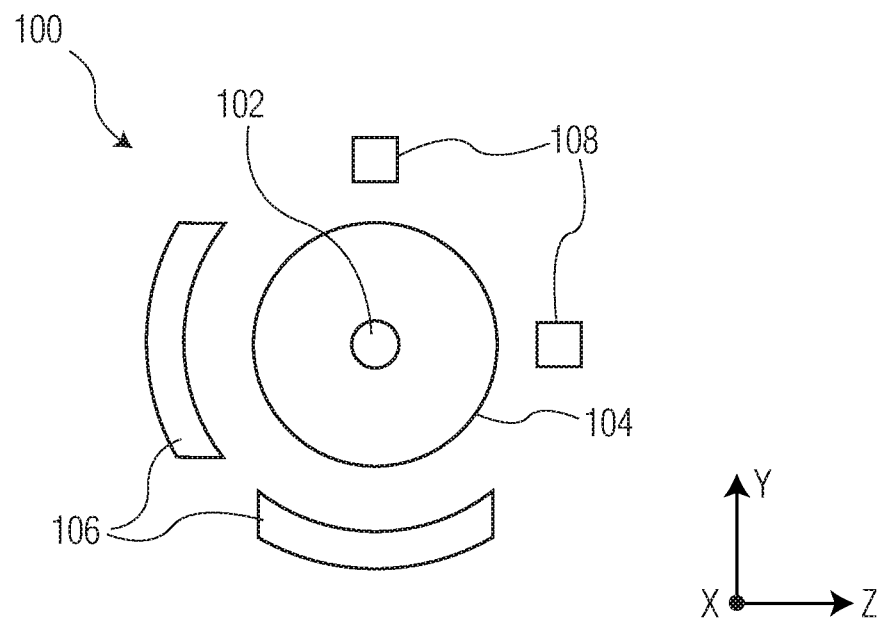
FIG. 1C is an end view of elements of the light measuring system of FIG. 1A.

FIG. 1B illustrates further details of light measuring system 100. In the example shown in FIG. 1B, a light producing element 108 is shown above tube 104 to direct light into transparent tube 104. Reflectors 106 are shown below tube 104, and to a first side of tube 104, to redirect light back towards tube 104 for curing. While not shown in FIG. 1B for simplicity, another light producing element 108 may be provided on the second side of tube 104 (the side opposite the reflector 106 on the first side of tube 104), but that another light producing element 108 has been removed from FIG. 1B for clarity (but is shown in FIG. 1C). Such a configuration is shown in the end view of the elements of light measuring system 100 shown in FIG. 1C.

Figure 2:
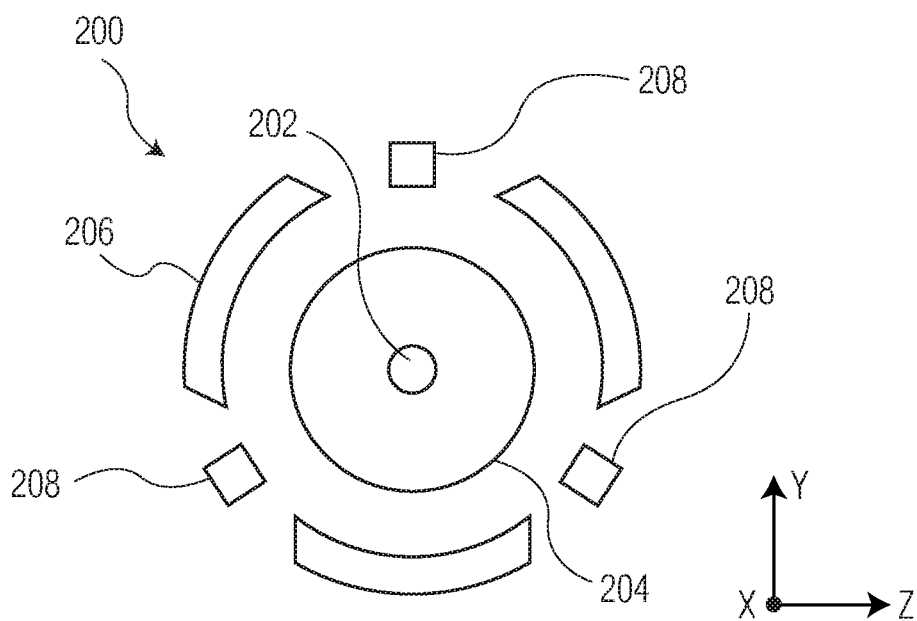
FIG. 2 is an end view of elements of another light measuring system in accordance with an exemplary embodiment of the invention.

Of course, within the scope of the invention, various different configurations of light producing elements and/or reflectors may be provided. For example, FIG. 2 illustrates an end view of elements of light measuring system 200 (which may be integrated into system 10 in FIG. 1A, in place of light measuring system 100). Light measuring system 200 includes 3 light producing elements 208 arranged in a triangle configuration around tube 204, with three reflectors 206 positioned opposite each light producing element 208. Thus, for curing a coating applied to an optical fiber in tube 204 (the optical fiber not being shown in FIG. 2, but see FIG. 1A), light from each light producing element 208 is directed toward transparent tube 204, with additional light reflected back towards tube 204 from reflectors 206. Light collecting probe 202 is shown in tube 204, for absorbing light in tube 204 for measuring the light (where probe 202 may be moved to different locations within tube 204, as described herein in connection with the various different light collecting probes) such that the light in tube 204 may be mapped or otherwise collected and organized.

Light collecting probes 102/202 may take a number of different forms within the scope of the invention. FIGS. 3A-3B, FIGS. 4A-4B, FIGS. 5A-5B, and FIGS. 6A-6B illustrate examples of such light collecting probes 102/202. That is, each of light collecting probes 102a, 102b, 102c, and 102d from FIGS. 3A-3B, FIGS. 4A-4B, FIGS. 5A-5B, and FIGS. 6A-6B may be substituted for light collecting probes 102, 202 from FIGS. 1A-1C and FIG. 2.

Figure 3A:
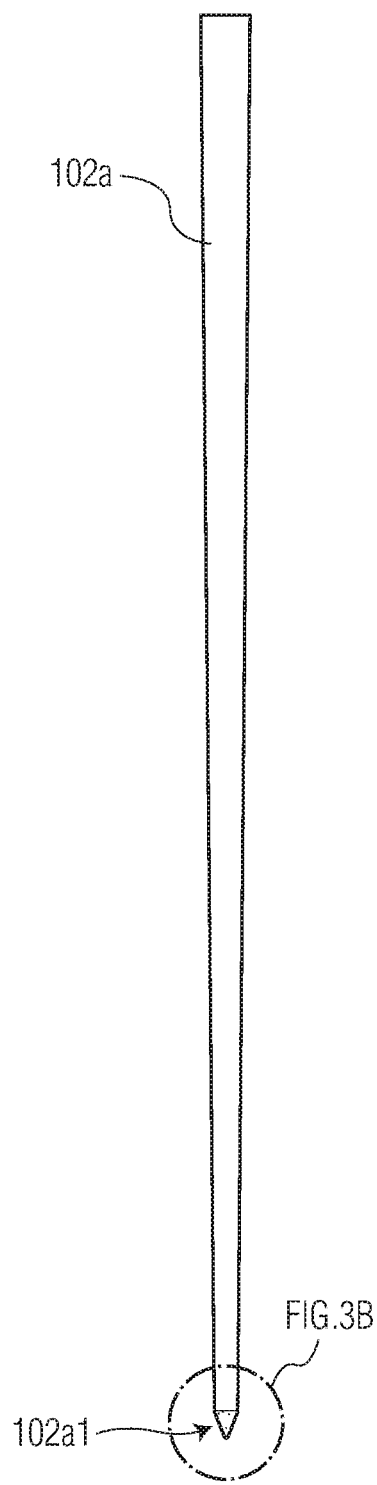
FIG. 3A is a side view of a light measuring probe in accordance with an exemplary embodiment of the invention.
Figure 3B:
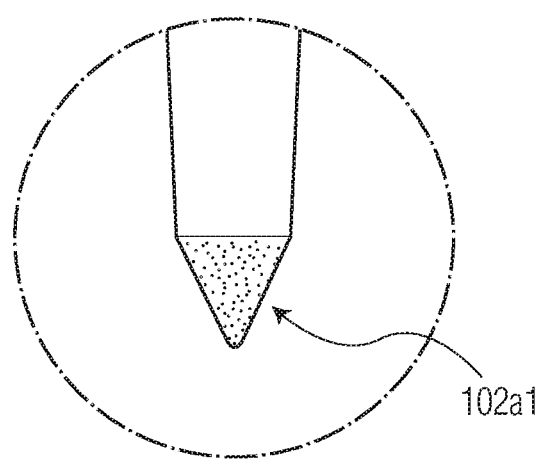
FIG. 3B is a detailed view of a portion of the light measuring probe of FIG. 3A.

Referring specifically to FIGS. 3A-3B, a light collecting probe 102a (e.g., a quartz probe) is shown. Light collecting probe 102a includes a tip portion 102a1 having a conical shape (also see the detailed view provided in FIG. 3B). Conical tip portion 102a1 of light collecting probe 102a is substantially symmetric. That is, tip portion 102a1 (shown as the "dotted" tip region) may be considered as a light sensor for absorbing light (and it may be frosted to obtain a cosine dependence)—with tip portion 102a1 having an identical design around the perimeter of tip portion 102a1.

Referring specifically to FIGS. 4A-4B, a light collecting probe 102b (e.g., a quartz probe) is shown. Light collecting probe 102b includes a tip portion 102b1 having a cylindrical shape (also see the detailed view provided in FIG. 3B). In contrast to conical tip portion 102a1 of FIGS. 3A-3B (and spherical tip portion 102c1 of FIGS. 5A-5B), only a portion of the cylindrical tip portion 102b1 of light collecting probe 102b is frosted (shown as the "dotted" tip region) (e.g., approximately 100° of the circumference at tip portion 102b1), and therefore provides some directionality for the incident light measurement. More specifically, and as made clear in FIG. 4B, only a portion of cylindrical tip portion has been processed/frosted to uniformly disperse the incident light, thereby directing light to enter tip portion 102b1 at the frosted portion. Further, to inhibit (and perhaps prevent) light from entering the probe's smooth surface (the non-frosted portion), an opaque high temperature ink may be applied on the opposite side and end of the probe.

Figures 5A, 5B:
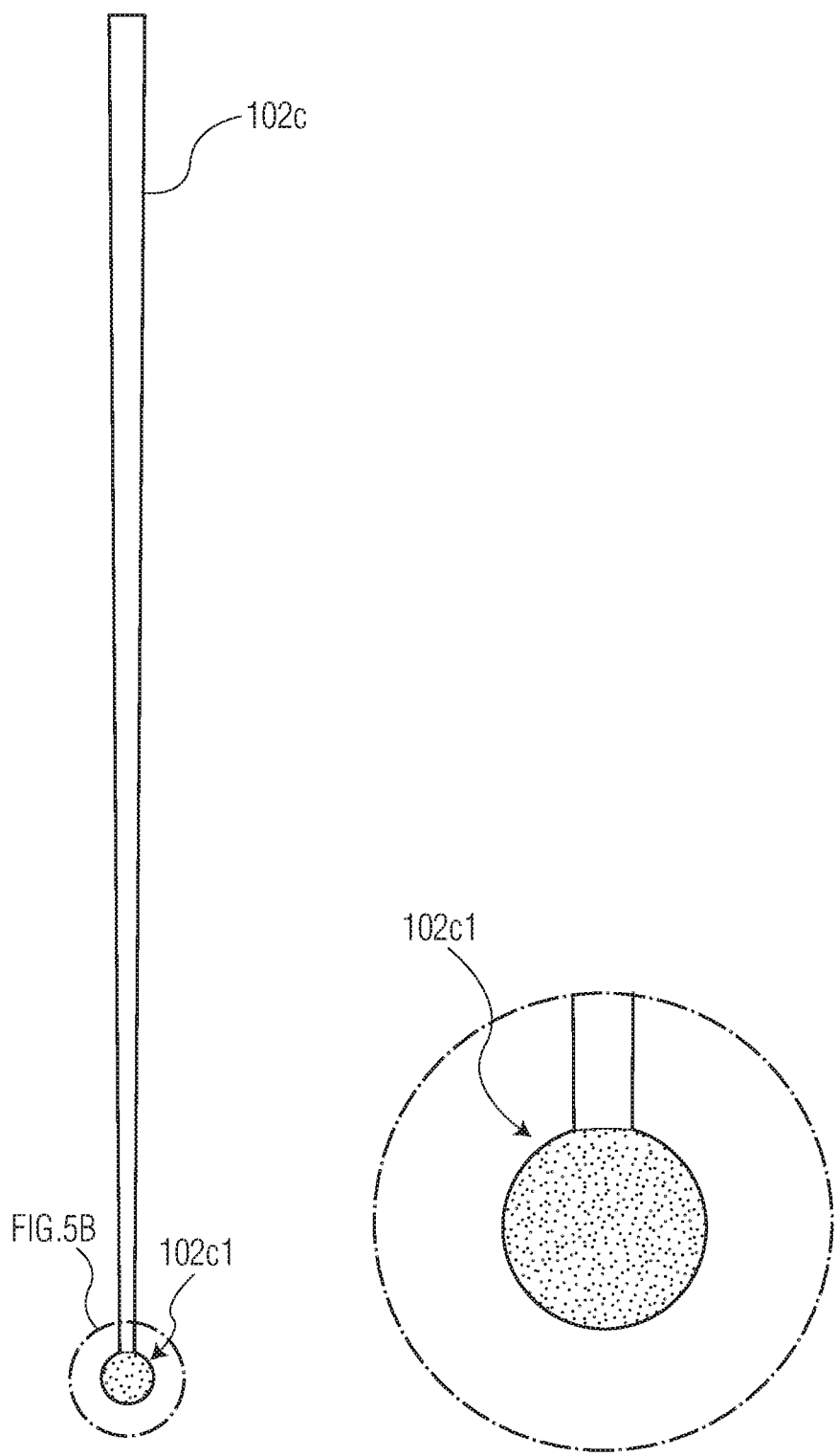
FIG. 5A is a side view of yet another light measuring probe in accordance with another exemplary embodiment of the invention.
FIG. 5B is a detailed view of a portion of the light measuring probe of FIG. 5A.

Referring specifically to FIGS. 5A-5B, a light collecting probe 102c (e.g., a quartz probe) is shown. Light collecting probe 102c includes a tip portion 102c1 having a spherical shape (also see the detailed view provided in FIG. 5B). Spherical tip portion 102c1 of light collecting probe 102c is substantially symmetric. That is, tip portion 102c1 (shown as the "dotted" tip region) may be considered as a light sensor for absorbing light (and it may be frosted to obtain a cosine dependence)—with tip portion 102c1 having an identical design around the perimeter of tip portion 102c1.

Referring specifically to FIGS. 6A-6B, a light collecting probe 102d (e.g., a quartz probe, with a PTFE tip) is shown. Light collecting probe 102d includes a rod shaped body portion (e.g., a quartz probe) enclosed in a metal tube, terminating at a light collecting tip portion, where the tip portion is covered by a cap portion 102d1 to block light from entering the light collecting tip portion. Cap portion 102d1 defines an aperture 102d2 configured to allow light to be selectively received by the light collecting PTFE tip portion.

More specifically, light collecting probe 102d may be utilized to measure the uniformity of directed light (e.g., the light that would be incident on a fiber region) rather than measure irradiance. In this regard, the acceptance angle of the sensor (the light collecting PTFE tip portion of light collecting probe 102d) is purposely limited by the cap portion 102d1. More specifically, the acceptance angle is defined by aperture 102d2 of cap portion 102d1 (e.g., where cap portion 102d1 may be considered a metal shield with a PTFE diffuser directly behind aperture 102d2).

For example, cap portion 102d1 may be formed from a metal such as a stainless steel tube. In a specific example, light collecting probe 102d is formed from a quartz rod material in contact with a short cylinder (rod) of PTFE, and aperture 102d2 exposes a small portion of the PTFE rod to act as the light collecting tip portion of light collecting probe 102d. An exemplary range for the size of aperture 102d2 is 0.5 mm$^2$-3 mm$^2$, and an exemplary range for the acceptance angle for the light entering the light collecting tip portion through aperture 102d2 is 15°-45°. Such a range for the acceptance angle may be enabled through the selective removal of material of cap portion 102d1 around aperture 102d2, so as to not shadow the exposed area of light collecting probe 102d. In one specific example, aperture 102d2 exposes approximately 1 mm$^2$ of the PTFE rod, and provides an acceptance angle of 30° for the light collecting tip portion. Of course, various processes may be used to form such probes including such cap portions (with the aperture), including 3D printing, laser machining (or EDM) to form the aperture, among other processes. Further still, light collecting probes according to the invention may be fluid cooled (e.g., water cooled), and may define one or more channels configured to receive a cooling fluid.

Light is absorbed by the light collecting tip portion of a light collecting probe (e.g., probe 102, probe 202, probe 102a, probe 102b, probe 102c, probe 102d, among others within the scope of the invention), and is directed to a data acquisition system. The data acquisition system may include a photodetector configured to (i) receive light from the light collecting probe, and (ii) determine the level of light using the light received from the light collecting probe. In another example, the data acquisition system may include an optical spectrometer configured to (i) receive light from the light collecting probe, and (ii) determine the level of light and/or the light wavelength distribution using the light received from the light collecting probe.

Specifically, light absorbed by the light collecting probe is guided to the data acquisition system to measure the relative optical signal as the light collecting probe is moved within the curing tube. In a very specific example, the data acquisition system may include a photodiode/preamplifier coupled to the distal end (non-light collecting end, opposite the light collecting tip portion) of the light collecting probe, and then connected to a processing circuit through a coaxial cable or the like.

Significant benefits may be provided through the utilization of the inventive probes, systems, and related methods. For example: light measurement may be provided with a high spatial resolution; 3D light measurement/mapping may be provided to fully characterize the light (e.g., ultraviolet light) in the tube; and the angular distribution of light in the tube may be provided. In a specific example, because of the movement of a light measuring probe (e.g., linear movement, rotative movement, etc.) within a curing tube, a 360° view of the light in the tube may be provided, thereby enabling mapping of the light in the tube, which enables predictability of operation, and also enables improvements in the curing system.

Such benefits are significant in comparison to conventional measurement systems which provide light measurement data at single fixed point in a curing tube.

Three dimensional (3D) mapping of light within a curing tube in accordance with the invention provides significant information about lamp performance (as opposed to a single irradiance value as with conventional light measurement systems).

Further, aspects of the invention (e.g., including a cap portion over the light collecting tip portion of the probe, with an aperture configured to direct the incoming light, as desired, for example, at a given angle) allows for angularly resolved information of the light that is being measured, or more simply what direction the light is coming from. This capability can quantify the irradiance uniformity around the fiber target and reduce "shadowing" by components that may be in the path of the light source. It can also determine degradation of optical components (e.g., the curing tube, reflectors, etc.) as it provides a highly directional sampling area.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for measuring light in a tube, the system comprising:
   a tube;
   a light collecting probe configured to absorb light within the tube, wherein the light collecting probe includes a rod shaped body portion terminating at a light collecting tip portion, the rod shaped body portion being formed of a quartz material, at least a portion of the light collecting tip portion being frosted;
   a data acquisition system for determining a level of light associated with light absorbed by the light collecting probe; and
   a motion system for moving the light collecting probe within the tube.

2. The system of claim 1 wherein the data acquisition system includes a photodetector configured to (i) receive light from the light collecting probe, and (ii) determine the level of light using the light received from the light collecting probe.

3. The system of claim 1 wherein the data acquisition system includes an optical spectrometer configured to (i) receive light from the light collecting probe, and (ii) determine the light wavelength distribution using the light received from the light collecting probe.

4. The system of claim 1 wherein the motion system is configured to move the light collecting probe along a plurality of motion axes within the tube.

5. The system of claim 4 wherein the plurality of motion axes includes at least one linear motion axis and at least one rotative motion axis.

6. The system of claim 1 wherein the light collecting tip portion has a conical shape.

7. The system of claim 1 wherein the light collecting tip portion has a spherical shape.

8. The system of claim 1 wherein the light collecting tip portion has a partially cylindrical shape.

9. A system for measuring light in a tube, the system comprising:
   a tube;
   a light collecting probe configured to absorb light within the tube, the light collecting probe including (i) a rod shaped body portion terminating at a light collecting tip portion and (ii) a cap portion for covering the light collecting tip portion to block light from entering the light collecting tip portion, the cap portion defining an aperture configured to allow light to be selectively received by the light collecting tip portion, the aperture being utilized to define an acceptance angle for light received by the light collecting probe;
   a data acquisition system for determining a level of light associated with light absorbed by the light collecting probe; and
   a motion system for moving the light collecting probe within the tube.

10. The system of claim 9 wherein the data acquisition system includes a photodetector configured to (i) receive light from the light collecting probe, and (ii) determine the level of light using the light received from the light collecting probe.

11. The system of claim 9 wherein the data acquisition system includes an optical spectrometer configured to (i) receive light from the light collecting probe, and (ii) determine the light wavelength distribution using the light received from the light collecting probe.

12. The system of claim 9 wherein the motion system is configured to move the light collecting probe along a plurality of motion axes within the tube.

13. The system of claim 12 wherein the plurality of motion axes includes at least one linear motion axis and at least one rotative motion axis.

* * * * *